United States Patent [19]

Yokokoji et al.

[11] 4,212,299
[45] Jul. 15, 1980

[54] CONTAINER BAG

[75] Inventors: Shyoji Yokokoji, Sayama; Kazuhisa Hoshino, Ichikawa, both of Japan

[73] Assignee: Toppan Printing Co., Ltd., Japan

[21] Appl. No.: 912,082

[22] Filed: Jun. 2, 1978

[30] Foreign Application Priority Data

Jun. 7, 1977 [JP] Japan .................................. 52-67041
Jan. 26, 1978 [JP] Japan .................................. 53-7658
Feb. 6, 1978 [JP] Japan .................................. 53-12101

[51] Int. Cl.² .......................... A61J 1/00; A61M 5/00
[52] U.S. Cl. ............................... 128/272; 128/214 D; 128/DIG. 24
[58] Field of Search .......... 128/272, 214 D, DIG. 24; 260/29.1 R; 150/1, 6; 229/3.5 R; 428/384

[56] References Cited

U.S. PATENT DOCUMENTS

| 3,642,047 | 2/1972 | Waage | 128/272 |
| 3,942,529 | 3/1976 | Waage | 128/272 |
| 4,105,118 | 8/1978 | Williams, Jr. et al. | 229/3.5 MF |

FOREIGN PATENT DOCUMENTS 4008079 2/1974 Japan ...................................... 128/272

Primary Examiner—Robert W. Michell
Assistant Examiner—Thomas Wallen
Attorney, Agent, or Firm—Lerner, David, Littenberg & Samuel

[57] ABSTRACT

A container bag for use in preserving blood or its component materials in liquid nitrogen. The container bag has excellent physical properties especially in quite low temperature conditions and is composed of: an inner layer made of ethylene-tetrafluoroethylene copolymer and an outer layer made of one member selected from the group consisting of polyethylene phthalate, polyethylene naphthalate, cross-linked polyethylene, perfluoroalkoxy resin, polytetrafluoroethylene, tetrafluoroethylene-hexafluoropropylene copolymer and aromatic polyimide.

5 Claims, 2 Drawing Figures

CONTAINER BAG

BACKGROUND OF THE INVENTION (1) Field of the Invention

This invention relates to a container bag for use in the preservation or transport of blood or the component material of blood at a quite low temperature in the range of −170° to −196° C. More particularly, the invention relates to a container bag which is quite suitable for the use at a low temperature such as −196° C. without the occurrence of tearing owing to the brittleness and is light in weight, produced easily and good in transparency. The container bag is made of an inner layer of ethylene-tetrafluoroethylene copolymer and an outer layer made of a resin selected from the group consisting of polyethylene naphthalate, cross-linked polyethylene, perfluoroalkoxy resin, polytetrafluoroethylene, tetrafluoroethylene-hexafluoropropylene copolymer, and aromatic polyimide.

(2) Description of the Prior Art

In the conventional art, the containers for blood have been made of glass, polyvinyl chloride, polypropylene and the like. In recent years, only a single component of blood such as erythrocyte is used in blood transfusion in view of therapeutics. Further, blood and its components are preserved for a long time and they are used as occasion demands or in an urgent need. That is, the quantity of blood transfusion is now increasing and the long term preservation of blood is desired earnestly.

As the known blood preservation methods, there are ACD blood preservation method (preserved at 4° to 6° C. in glass bottles, polyvinyl chloride containers or polypropylene containers) and slow freezing method (preserved at −80° to −90° C. in polyvinyl chloride containers). In the former method, the available period of the blood is short, for example, about 21 days from the blood-collecting owing to the blood metabolism during the preservation. While, in the latter method, high concentration glycerol is used as an additive for preventing the evil effect in freezing, so that it must be rinsed off and the rate of recovery of erythrocyte after preservation becomes very low. Further, the quality of erythrocyte is reduced in the slow freezing method as compared with the quick freezing method.

The above-described disadvantages have been eliminated in recent years since the quick freezing method was proposed. In the quick freezing method, the blood is instantaneously frozen in liquid nitrogen (−196° C.) and it is preserved at a quite low temperature in the range of −170° to −196° C. In this quick freezing method, however, the problem of blood container is left unsolved and the containers or receptacles which are durable in such a quite low temperature are earnestly desired.

As the preservation containers for the quick freezing method, the foregoing containers made of vinyl chloride and polypropylene are not suitable because they are liable to crack by slight shocks at such a low temperature. The glass containers are broken quite easily, in addition, the thicknesses of the container walls are large, therefore, the glass containers are disadvantageous in view of thermal conductivity in the quick freezing method. Upon this, the containers made of aluminium or stainless steel have been proposed as the blood containers for quick blood freezing, however, the production and the sealing of mouths or openings of these metal containers are quite difficult. If the liquid nitrogen penetrates into the container, the erythrocyte in the container is destroyed. In addition, the metal container is not transparent so that the blood in the container cannot be observed through the wall of the container. Furthermore, since the blood container is used only once and then it is thrown away in blood banks and blood centers, it becomes expensive and cannot be used repeatedly or for various purposes.

BRIEF SUMMARY OF THE INVENTION

This invention has been accomplished in view of the above-described circumstances in the conventional art.

It is, therefore, the primary object of the present invention to provide an improved container bag which is suitable for use in the preservation of blood or its component in the liquid nitrogen at −196° C.

Another object of the present invention is to provide a container bag which is not damaged by its brittleness at a low temperature such as −196° C., has good thermal conductivity and is easily used for the quick freezing to −196° C. and the quick thawing to an ambient temperature.

A further object of the present invention is to provide a container bag which can be sealed up by heating without difficulty and the heat-sealed portion is durable.

Still a further object of the present invention is to provide a container bag which has such advantages that the bag itself is transparent so that the quality of the contents or contamination thereof can be examined previously to the thawing, it can be produced at low cost in hygienic state without giving no ill effect to blood, and the bag is durable to the sterilizing or pasteulizing treatment before it is frozen.

In accordance with the present invention, the container bag for preserving blood or its component materials in liquid nitrogen, is composed of: an inner layer which is made of ethylene-tetrafluoroethylene copolymer and an outer layer which is made of one member selected from the group consisting of polyethylene phthalate, polyethylene naphthalate, cross-linked polyethylene, perfluoroalkoxy resin, polytetrafluoroethylene, tetrafluoroethylene-hexafluoropropylene copolymer and aromatic polyimide. The above polyethylene phthalate has an almost the same melting temperature as that of the inner layer and the remainders of the above outer layer materials have melting points or termal adhesion points which are higher than that of the inner layer.

BRIEF DESCRIPTION OF THE DRAWINGS

The nature, principle and details of the present invention will be more clearly apparent from the following detailed description with respect to preferred embodiment of the invention with the accompanying drawings, in which.

DESCRIPTION OF THE PREFERRED EMBODIMENT

Referring now to the accompanying drawings, the preferred embodiment of the present invention will be described in detail.

Figure 2:
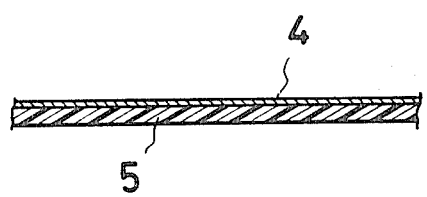
FIG. 2 is a vertical cross-sectional view of the wall portion of the same, showing the layered structure.

In the laminated sheet as shown in FIG. 2, the inner layer 5 is made of a film of ethylene-tetrafluoroethylene copolymer. Since the resin film of the inner layer 5 is brought into contact with the blood directly, it must have the adaptability to blood and be of sanitary and nonpoisonous characters. Further, the container bag is sterilized before it is filled with blood so that it must be durable to such high temperature sterilization without causing any thermal sticking. Since it is handled in a quite low temperature of −196° C. in liquid nitrogen, the container bag should not become brittle without suffering any damage. Furthermore, the container bag can be sealed up at a practical temperature and the sealed portion must be durable sufficiently.

The polymer materials which meet with these requirements are almost restricted to fluorine resins, especially, exemplified as such resins are ethylene-tetrafluoroethylene copolymer (hereinafter referred to as "ETFE"), polychlorinated trifluoroethylene (hereinafter referred to as "PCTFE"), tetrafluoroethylene-hexafluoropropylene copolymer (hereinafter referred to as "FEP") and perfluoroalkoxy resin (hereinafter referred to as "PFA"). The PCTFE is easy in thermal adhesion as it has a low melting point of 210° to 225° C., however, thermal sticking is caused to occur by the softening of the resin during dry thermal sterilization at, for example, 180° C. for 1 hour. Further, the resin itself does not become brittle at the low temperature condition, however, it is defective in that the crystallization proceeds or the strength becomes low by partial thermal decomposition in the sealed portion, therefore, stable sealing cannot be attained by using an ordinary heat sealer. The FEP has a high melting point of 290° C. so that the adaptability to heat sealing is not good, in addition, as compared with other fluorine resins, the tensile strength is low and the elongation is large. Therefore, when a large and flat blood container bag of about 1 liter is made with using the material of 0.1 mm or less in thickness (with which the freezing rate is not retarded), the sealing strength becomes insufficient. The PFA has a high melting point of 302° to 310° C. so that the heat sealing temperature is still higher, for example, temperatures not lower than 350° C. Therefore, the sealing of this resin is difficult. While, the ETFE has an adequate melting point of 265° to 270° C. so that it is durable in the sterilization before the filling of blood, from wet thermal sterilization at 121° C. for 20 minutes to dry thermal sterilization at 135° to 200° C., without causing the thermal sticking of inner layer films (ETFE). Further, it can be thermally bonded relatively easily in the condition between the melting point and 300° C., and 0.05 mm thick films show the sealing strength of 6 kg/15 mm or larger, while, the sealing strengths of other PCTFE, FEP and PFA are 3 kg/15 mm at most. Therefore, it is possible to use the thin films of ETFE, and in view of this fact, it is quite suitable as the inner layer material of blood container bags for the quick freezing. Furthermore, the ETFE is flexible at the quite low temperature of −196° C. and has good physical properties. Still further, the sanitary properties are good, moisture permeability is low and the deterioration of blood ingredients is not caused to occur even when blood is preserved for a long period of time.

The outer layer material 4 will be described in the following. The above-described inner layer material of ETFE can be used for producing single layer bags, however, the sealed portion becomes thin owing to the heat and pressure in sealing, and the seal edge portion becomes liable to tear so that sufficiently large sealing strength cannot be obtained. Further, since the film sticks to the seal cover in sealing work, the sealing surface is stained and stable sealing work cannot be attained. Therefore, it is desirable to laminate it with an outer layer material 4.

As the outer layer resin film 4, it is desirable that the melting point or thermal sticking point is higher than that of the ETFE as the inner layer resin. In order to improve the heat sealing property and raise the safety in use, the above fact is desirable, however, the material having almost the same thermal property can also be employed.

The outer layer materials 4 must have thermal resistance as described in connection with the inner layer material, as well as the durability in low temperature condition. Exemplified as such materials are polyethylene terephthalate (biaxially oriented), polyethylene naphthalate, cross-linked polyethylene, perfluoroalkoxy resin, polytetrafluoroethylene, tetrafluoroethylene-hexafluoropropylene copolymer and aromatic polyimide. The inner and outer layer films can be bonded in layers by using adhesive. It is necessary that the adhesive must have both low temperature resistance and high temperature resistance. Most of thermally resistant adhesives such as polyester, polyurethane and epoxy adhesives can be employed.

Figure 1:
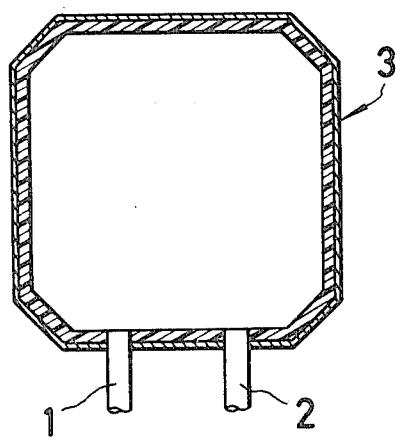
FIG. 1 is a cross-sectional plan view of an embodiment of the blood container bag of the present invention.

A pair of the above-described laminated sheets are put in layers with their inner layers inside, and when sealed together, the container bag as shown in FIG. 1 can be obtained. Without saying, the bag is provided with an inlet member 1 and an outlet member 2 as the container for blood preservation or transport.

The temperature of heat sealing is higher than the melting point of the inner layer resin ETFE and lower than the melting point or thermal sticking point of the outer layer resin.

When the preservation bag for freezing blood is made of thick sheets of low in thermal conductivity, the times for freezing and thawing become long, in addition, the damage of the contents of blood (erythrocyte) becomes large. So that, the thickness of the sheets is made as small as possible. In view of practical working, it is desirable that the thickness of each layer is in the range of 0.01 to 0.1 mm, and preferably, the total thickness is not more than 0.1 mm. In view of this point, as described in the present specification, it is quite serviceable that the strength is improved by the combination of the inner and outer layers. The melting points of the resins for the inner and the outer layers are shown in the following Table 1.

Table 1

| Resin materials | Melting points |
| --- | --- |
| Ethylene-tetrafluoroethylene copolymer | 265°–270° C. |
| Polyethylene terephthalate* | 264° C. |
| Polyethylene naphthalate | 273° C. |
| Cross-linked polyethylene (Gel fraction: 56.4%) | 300° C. or higher |
| Perfluoroalkoxy resin | 305° C. |
| Tetrafluoroethylene-hexafluoropropylene copolymer | 290° C. |
| Aromatic polyimide | 400° C. or higher |

Note for Table 1:
*The melting point of polyethylene terephthalate is almost the same as that of ethylene-tetrafluoroethylene copolymer, however, it can be used by applying some means in the heat sealing work, for example, by cooling with a heat seal bar immediately after the thermal adhesion.

As described above, the container bag of the present invention can be easily produced since it is made by heat sealing. Further, the leakage of contents in the bag hardly occurs during the preservation or transport at the low temperature of −196° C. since the crack and damage of the bag does not occur, and the bag is quite satisfactory in the sanitary view point without toxic character. In addition, since all the materials used have thermal resistance above 200° C., the container bag of the present invention is durable in various sterilizing operations. Furthermore, the container bag of the present invention is almost colorless transparent, and even when aromatic polyamide is used for the outer layer, the bag is slightly colored transparent, so that the state of preserved blood can be observed before the thawing.

The present invention will be further described in the following with reference to some examples.

EXAMPLE 1

A 0.050 mm thick ethylene-tetrafluoroethylene copolymer film was subjected to corona discharge treatment and the treated side of the film was stuck in layers to a 0.025 mm thick polyethylene naphthalate film which had been applied with 3 g/m$^2$ of a polyester isocyanate adhesive, thereby obtaining a double layer laminated film. Two sheets of the above-described films were put in layers with the ethylene-tetrafluoroethylene copolymer films inside and a 400 ml blood preserving bag was made by heat sealing, in which inlet and outlet members made of ethylene-tetrafluoroethylene copolymer were attached to the bag. This container bag was sterilized at 180° C. for 1 hour in dry condition and it was filled with erythrocyte. The container bag was then preserved for 1 year by freezing at −196° C. and after that, the contents were thawed. The components of erythrocyte were not changed and the deterioration and damage of the container bag in handling thereof were not caused to occur at all.

EXAMPLE 2

A 0.05 mm thick ethylene-tetrafluoroethylene copolymer film was subjected to corona discharge treatment and the treated side of the film was stuck to a 0.025 mm thick aromatic polyimide film which had been applied with 3 g/m$^2$ of a polyester isocyanate adhesive, thereby obtaining a double layer laminated film. Two sheets of the above-described films were put in layers with the ethylene-tetrafluoroethylene copolymer films inside and a 400 ml blood preserving bag was made by heat sealing with using the inlet and outlet members made of ethylene-tetrafluoroethylene copolymer. This container bag was sterilized at 200° C. for 30 minutes in dry condition and filled with erythrocyte. The container bag was then preserved for 1 year by freezing at −196° C., and after that, the contents were thawed. The components of erythrocyte were not changed and neither the deterioration nor the damage of the container bag was caused to occur at all in handling thereof.

The above-described laminated films were subjected to penetration test at a low temperature of −196° C., the results of which are shown in the following Table 2.

Table 2

| Conditions and residual elongation rates in penetration test in liquid nitrogen Piano wire: 0.5$^R$ Speed of penetration: 30 mm/min | | | | |
|---|---|---|---|---|
| Item | Example 1 | Example 2 | 0.1 mm LDPE | 0.35 mm plasticized PVC |
| Residual elongation rate | 98% | 99% | 24% | 15% |
| Condition | Good | Good | Completely crushed | Completely crushed |

Residual elongation rate = $\frac{\text{low temp. elongation}}{\text{high temp. elongation}} \times 100$ It will be understood that the plasticized PVC blood bag is quite brittle at the low temperature. The container bag of the present invention has satisfactory properties in low temperatures, therefore, it is quite suitable for preserving freezed blood.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A container bag for preserving blood or its component materials at temperatures in the range of liquid nitrogen temperatures, which container bag comprises an inner layer of ethylene-tetrafluoroethylene copolymer, and an outer layer of a member selected from the group consisting of perfluoroalkoxy resin, polytetrafluoroethylene, and tetrafluoroethylene-hexafluoropropylene copolymer, said outer layer materials having melting points or thermal sticking points which are higher than those of said inner layer.

2. A container bag as claimed in claim 1, wherein said inner layer and said outer layer are bonded together by using an adhesive.

3. A container bag as claimed in claim 1, wherein a thermally resistant adhesive is used, which adhesive is selected from the group consisting of polyester type, polyurethane type and epoxy type adhesives.

4. A container bag as claimed in claim 1, wherein the total thickness of the film for forming said bag is not more than 0.1 mm.

5. A container bag as claimed in claim 1, which is provided with an inlet member and an outlet member.

\* \* \* \* \*